(12) United States Patent
Ahlers et al.

(10) Patent No.: US 7,059,611 B2
(45) Date of Patent: Jun. 13, 2006

(54) GAP SEALING ARRANGEMENT

(75) Inventors: Burkhard Ahlers, Bargteheide (DE); Michael Koch, Kalefeld (DE); Edgar Mumme, Hildesheim (DE)

(73) Assignee: Meteor Gummiwerke K.H. Badje GmbH & Co., Bockenem (DE)

( * ) Notice: Subject to any disclaimer, the term of this patent is extended or adjusted under 35 U.S.C. 154(b) by 0 days.

(21) Appl. No.: 10/475,274

(22) PCT Filed: Apr. 12, 2002

(86) PCT No.: PCT/EP02/04111

§ 371 (c)(1),
(2), (4) Date: Oct. 20, 2003

(87) PCT Pub. No.: WO02/085657

PCT Pub. Date: Oct. 31, 2002

(65) Prior Publication Data

US 2004/0113372 A1 Jun. 17, 2004

(30) Foreign Application Priority Data

Apr. 19, 2001 (DE) .......................... 201 06 758 U

(51) Int. Cl.
*F16J 15/02* (2006.01)
*E06B 7/086* (2006.01)
*E06F 11/36* (2006.01)
*E05B 7/16* (2006.01)

(52) U.S. Cl. .............. 277/628; 277/637; 49/91.1; 49/355

(58) Field of Classification Search ............... 277/628, 277/630, 637, 645, 921; 49/91.1, 303, 316, 49/355, 475.1, 479.1
See application file for complete search history.

(56) References Cited

U.S. PATENT DOCUMENTS

| 2,622,286 A | | 12/1952 | Beck ............................. 20/69 |
| 3,656,260 A | * | 4/1972 | Weaver et al. ............. 49/489.1 |
| 4,858,385 A | | 8/1989 | Bright ......................... 49/488 |

(Continued)

FOREIGN PATENT DOCUMENTS

DE       1 525 437       11/1970

(Continued)

*Primary Examiner*—Vishal Patel
(74) *Attorney, Agent, or Firm*—Synnestvedt & Lechner LLP

(57) ABSTRACT

In order to improve the fit and the sealing effect of a sealing arrangement which is intended to seal a gap (2) between two components (3, 4), which can be moved relative to each other, and an edge of an opening (5) which is to be closed, wherein a grip rail (10), to which a holding region (14) of a profile (15) can be positively latched, can be fixed to a first one (3) of the components, wherein a sealing region (16) of the profile (15) which cooperates in a sealing manner with a second one (4) of the components is attached to the holding region (14), the said sealing region (16) is disposed laterally offset with respect to the grip rail (10) towards an inner side (7) of the gap, wherein the resultant force (17) of a deformation force which acts upon the sealing region (16) runs at least approximately through the grip rail (10). As the two components (3, 4) move closer together, the laterally offset arrangement of the said sealing region (16) serves to produce a deformation force which presses the holding region of the profile (15) more firmly into the grip rail (10), so as to ensure a durably secure fit of the profile at its installation site.

31 Claims, 2 Drawing Sheets

U.S. PATENT DOCUMENTS

| | | | |
|---|---|---|---|
| 5,163,730 A | * | 11/1992 | Welch .................. 296/187.05 |
| 5,462,292 A | | 10/1995 | Yamane .................... 277/181 |
| 5,950,366 A | | 9/1999 | Uhlmeyer ................. 49/484.1 |
| 6,027,161 A | * | 2/2000 | Gondo ....................... 296/214 |

FOREIGN PATENT DOCUMENTS

| | | | |
|---|---|---|---|
| DE | 197 22 530 A1 | | 3/1998 |
| DE | 197 47 942 A1 | | 8/1998 |
| DE | 198 03 445 A1 | | 9/1998 |
| DE | 299 22 990 U1 | | 7/2000 |
| DE | 199 12 176 A1 | | 9/2000 |
| DE | 200 06 572 U1 | | 11/2000 |
| EP | 0 058 599 A1 | | 8/1982 |
| EP | 0 788 913 A1 | | 8/1997 |
| EP | 1 078 800 A2 | | 2/2001 |
| FR | 1.050.651 | | 2/1952 |
| JP | 58133918 | | 8/1983 |
| JP | 59089220 | | 5/1984 |
| JP | 10236163 | | 9/1998 |
| JP | 2000280756 A | * | 10/2000 |
| JP | 2001213172 A | * | 8/2001 |
| JP | 2001270333 A | * | 10/2001 |

* cited by examiner

GAP SEALING ARRANGEMENT

This is a national Stage entry of International Application No. PCT/EP02/04111, filed on Apr. 12, 2002, the entire specification, claims and drawings of which are incorporated herewith by reference.

BACKGROUND OF THE INVENTION

The invention relates to a sealing arrangement for a gap between two components which can be moved relative to each other, for example a closing element, such as a door or a hinged lid of a motor vehicle, and an edge of an opening which is to be closed.

In the case of a known sealing arrangement of this type (German patent reference DE 199 12 176 A1), a profile part which is substantially L-shaped in cross-section and comprises an embedded reinforcement is adhered to a door frame by means of an adhesive layer. The profile part is supported beyond the adhesive layer on the door frame by cross-pieces. Instead of using the adhesive layer, the profile part can also be held on the frame by clip connections which can be produced by crimping (column 2, lines 61 to 64). This profile part is to be connected to the door frame initially by a robotal machine. In a second working step, which is to be conducted preferably by hand, a profile seal is then placed with an attachment base on to an upstanding assembly limb of the profile part having a Christmas-tree profile. The profile seal is not connected on the inside to the L-shaped profile part. During operation, this can lead to visually unfavorable gaps and progressions of the profile seal.

Patent reference DE 198 03 445 A1 discloses a door peripheral frame component having a gap sealing arrangement, wherein the door frame is provided with a grip rail for the holding region of a sealing profile, wherein a sealing region which cooperates with the door skirting is attached to holding region of the profile and is laterally offset with respect to the grip rail towards an inner side of the gap, and wherein a support portion of the holding region which is remote from the sealing region is supported on a corner region of the door skirting. The support portion does not form any pronounced sealing rib with respect to the corner region and when the door is in the closed state the sealing region formed as a hollow profile is pressed directly against the door frame thus bridging a gap which would otherwise be present.

Patent reference DE 197 47 942 discloses a sealing arrangement for the gap between a door of a motor vehicle and the frame of the door, which sealing arrangement is characterized by a hollow sealing profile which is connected in a positive manner to the said door by way of a grip rail. Located between the sealing profile and the grip rail is a holding region which is formed with the same material as the sealing profile, and furthermore on the condition that the sealing profile and the grip rail are disposed in a flush manner with respect to each other, wherein in any event the sealing profile is not offset towards the inner side of the gap. Attached on both sides of the sealing profile are sealing lips which lie against structural parts of the door which, however, do not assume any kind of support function.

Patent references JP 10 236 163 and EP 0 058 599 disclose further sealing arrangements for sealing the gap between a door and a door skirting, in which hollow sealing profiles are positively held with the interpositioning of a holding region in a grip rail which is attached to the door or to the frame. The sealing profile, the holding region and the grip rail are disposed in a mutually flush manner in relation to a sealing force to be applied when the doors are in the closed state. The sealing profile is not disposed offset towards the inner side of the gap.

Finally, patent reference JP 59 089 220 discloses a further sealing arrangement for sealing the gap between a door and a door skirting, wherein a hollow sealing profile is held by means of a holding region in a grip rail which is fixedly connected to the door. Integrally formed on the holding region is a support portion which is supported on structural elements of the door frame, wherein the support portion and the sealing profile are disposed with the proviso that any deformation forces which occur in the closed state are substantially diverted by way of the support portion to structural parts of the doors.

Depending upon the specific production and inclusion of a grip rail, the manufacturing process of the respective sealing arrangement can be complicated. Furthermore, in some of these known sealing arrangements, it is disadvantageous that a deformation of the hollow sealing profile runs in an uncontrolled manner over wide areas.

SUMMARY OF THE INVENTION

Against the above background it is the object of the invention to form a sealing arrangement of the type described in the introduction with a reliable fit and enhanced sealing effect with regard to a controlled deformation and to an improved manufacturing capability. This object is achieved by the present invention which provides a sealing arrangement for a gap between first and second components which are moveable relative to each other between open and closed positions, for example a closing element, such as a door or a hinged lid of a motor vehicle, and an edge of an opening which is to be closed. The first component has a corner, and the gap has inner and outer sides. The sealing arrangement includes a grip rail fixable to the first component. The sealing arrangement further includes a profile having a holding region which can be positively latched to the grip rail, the profile further having a sealing region attached to the holding region and which cooperates in a sealing manner with the second component when the first and second components are in the closed position, the sealing region being disposed laterally offset with respect to the grip rail towards the inner side of the gap. The holding region has a support portion which is remote from the sealing region and which is supportable on the corner region of the first component, the support portion including at least one sealing rib which lies against the corner region. A resultant force of a deformation force acting upon the sealing region when the opening is closed runs at least approximately through the grip rail. In one preferred embodiment, the profile includes a support rib between the sealing region and the first component which is in contact with the first component at least when the first component is in the closed position.

The sealing region of the profile according to the invention is preferably tubular in formation, wherein by virtue of the arrangement of the sealing region which is laterally offset relative to the grip rail, the deformation force which occurs as the two components move closer to each other has the effect that the holding region of the profile is pressed ever more firmly into the grip rail. This guarantees a durably secure fit of the profile at its installation site. The penetration of moisture in the direction towards the grip rail is guaranteed by the sealing rib which lies against the corner region. Where a support rib is provided, the support rib comes into contact with the first component at the latest in the event of a sufficiently large deformation force acting upon the sealing region. This serves to support the sealing region and promote its controlled deformation under the influence of the deformation force. By virtue of the fact that the grip rail is preferably formed from sheet metal and is attached to the first component by continuous seam welding, advantages in terms of manufacturing technology are achieved, because the grip rail can be attached to the first component easily and in a reliably automated manner. The grip rail can extend all the way around the first component. The end-side ends of the grip rails can be sealed with respect to each other, e.g. they can be welded or bridged with a permanently elastic sealing compound. Where the level of strength is sufficient, the wall thickness of the grip rail, which is formed preferably from sheet metal, can be comparatively thin. This favors the design and dimensioning of the holding region of the profile.

In one embodiment of the sealing arrangement, the first component has an inner side covered with an inner lining, and the profile includes a sealing strip which lies continuously in a sealing manner against the inner lining, the sealing strip being disposed between the sealing region and the inner lining. In accordance with this embodiment, the inner lining preferably consists of a synthetic material plate. The fact that the sealing strip lies continuously against the inner lining means that it is possible to prevent the occurrence of a visually unfavourable gap at this site.

In another embodiment, when the first component is in the closed position, the gap terminates on the outside in a joint between the first and second components, a joint sealing lip, which is integrally formed on the profile, is anchored to an edge of the first component adjoining the joint, and the joint sealing lip lies against the second component to seal the joint. In accordance with this embodiment, a small amount of additional outlay ensures that the joint is effectively sealed, at least with respect to dust. Moreover, bridging the joint with a joint sealing lip gives a visually favorable impression.

The profile can consist of cellular rubber, e.g., cellular rubber with a Shore A hardness of 20 to 30.

In another embodiment, the holding region can consist of soft rubber and the sealing region consists of cellular rubber. Here the profile is preferably co-extruded in the duplex process. The soft rubber can have a Shore A hardness of 60 to 80 and the cellular rubber can have a Shore A hardness of e.g. 15 to 30. Therefore, this ensures on the one hand that the profile is held securely in the grip rail and on the other hand ensures low closing forces, because the sealing region can be deformed comparatively easily.

The grip rail can be formed in various configurations. For example the grip rail can include a substantially U-shaped cross-sectional area and have first and second edge regions drawn in towards each other, a substantially Z-shaped cross-sectional area, a substantially circular ring-shaped cross-sectional area, or a substantially V-shaped cross-sectional area. The formation of the grip rail is selected in an expedient manner depending upon the particular aspects of the individual case. In each case, assembly is convenient and quick and the profile fits tightly on the grip rail.

BRIEF DESCRIPTION OF THE DRAWINGS

These and further features and advantages of the invention will be explained in detail hereinunder with reference to the exemplified embodiments illustrated in the drawings, in which.

DESCRIPTION OF PREFERRED EMBODIMENTS

Figure 1:
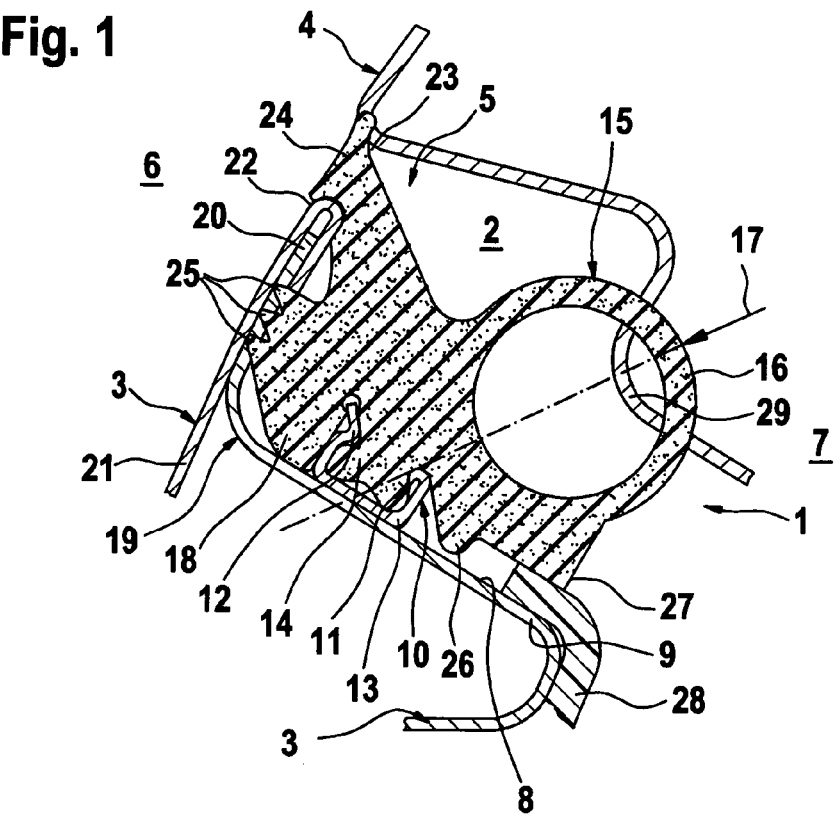
FIG. 1 shows an enlarged illustration of a cross-section of a first embodiment of the sealing arrangement with the associated first and second component.

FIG. 1 illustrates a sealing arrangement 1 for sealing a gap 2 between a first component 3 and a second component 4. In all of the exemplified embodiments illustrated in FIGS. 1 to 4, the first component 3 is a door and the second component 4 is an edge of an opening 5 in a motor vehicle which is to be closed. In each case, FIGS. 1 to 4 illustrate a cross-section of a roof frame as the second component 4 and a cross-section of an upper edge of the door as the first component 3. An outer side 6 and an inner side 7 of the motor vehicle are indicated.

A sheet metal grip rail 10 is attached on an upper side 8 of a door inner metal sheet 9 of the first component 3 by continuous seam welding. The grip rail 10 comprises a substantially U-shaped cross-sectional area having edge regions 11 and 12 which are drawn in towards each other and the grip rail is welded with a base 13 to the upper side 8.

A holding region 14 of a profile 15 is positively latched to the grip rail 10. A sealing region 16 of the profile 15 which cooperates in a sealing manner with the second component 4—in this case with a roof frame profile—is attached to the holding region 14. The sealing region 16 is tubular in formation and, like the holding region 14, consists of cellular rubber. The sealing region 16 is disposed laterally offset with respect to the grip rail 10 towards the inner side 7. The resultant force 17 of a deformation force acting upon the sealing region 16 runs at least approximately through the grip rail 10, as indicated by the line of action of the resultant force 17 shown by a dot-dash line.

A support portion 18 of the holding region 14 which is remote from the sealing region 16 is supported on a corner region 19 of the first component 3. The corner region 19 is created by virtue of the fact that the door inner metal sheet 9 is upwardly bent by about 90°. A door outer metal sheet 21 of the first component 3 is flanged over a free edge 20 of the door inner metal sheet 9. As a consequence, the door outer metal sheet 21 forms an edge 22 which defines a joint 23 with the opposite-lying second component 4 when the first component 3, which is formed as a door or closing element, is closed. Anchored to the edge 22 is a joint sealing lip 24 which is integrally formed on the profile 15. When the closing element 3 is closed, the joint sealing lip 24 which likewise consists of cellular rubber and is provided for sealing the joint 23 lies against the second component 4. Therefore, when the closing element 3 is closed, the joint sealing lip 24 seals the joint 23 at least with respect to dust. Moreover, the joint 23 is bridged in a visually favorable manner.

The support portion 18 is provided towards the outer side 6 with three mutually parallel sealing ribs 25 which lie in a sealing manner against an inner side of the first component 3.

The profile 15 is provided with a support rib 26 between the sealing region 16 and the door inner metal sheet 9 of the first component 3. When the profile 15 is not tensioned, as illustrated in FIG. 1 despite the closed closing element 3, the support rib 26 is located at a small spaced interval from the upper side 8 of the door inner metal sheet 9. This serves the purpose that, even when the profile 15 is not tensioned, a sealing strip 27 which is integrally formed on the sealing region 16 lies under a certain degree of pre-tensioning against an inner lining 28 of the first component 3. The inner lining 28 consists of a synthetic material plate which covers the first component 3 on the inner side 7. Only when the closing element 3 is closed and a deformation force is exerted in the direction of the resultant force 17 upon the profile 15, does the support rib 26 come into contact with the upper side 8 of the door inner metal sheet 9. Consequently, in order to enhance the sealing effect of the sealing region 16, the sealing region 16 is also supported directly on the door inner metal sheet 9. This sealing effect is further enhanced by a bead 29 of the second component 4 which protrudes in the direction of the sealing region 16.

In all of the Figures, like parts are designated by like reference numerals.

Figure 2:
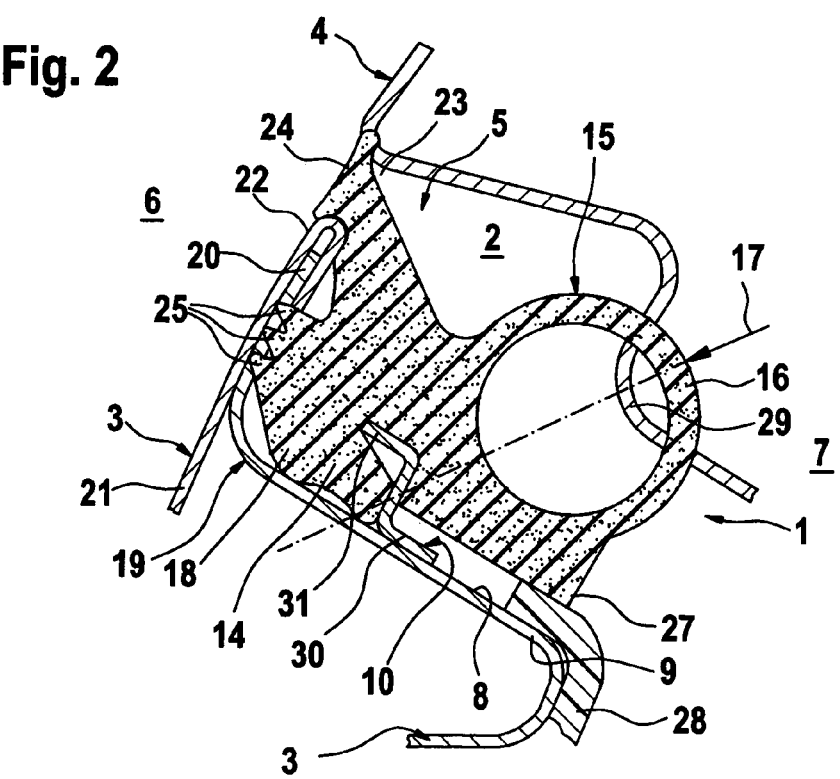
FIGS. 2 to 4 show in each case a cross-section, corresponding to FIG. 1, of other embodiments of the sealing arrangement.

In FIG. 2, the grip rail 10 comprises a substantially Z-shaped cross-sectional area, wherein a base limb 30 is attached to the door inner metal sheet 9. Preferably, this attachment can also be accomplished, as in the case of all of the embodiments, by continuous seam welding but can also be achieved in another way, e.g. by adhesion. A second limb 31 of the grip rail 10 points with its free end edge outwardly into the corner region 19 of the first component 3. Thus, the holding region 14 of the profile 15 can engage underneath the second limb 31 in the manner shown in FIG. 2 for the purpose of anchoring the profile 15 more effectively.

Figure 3:
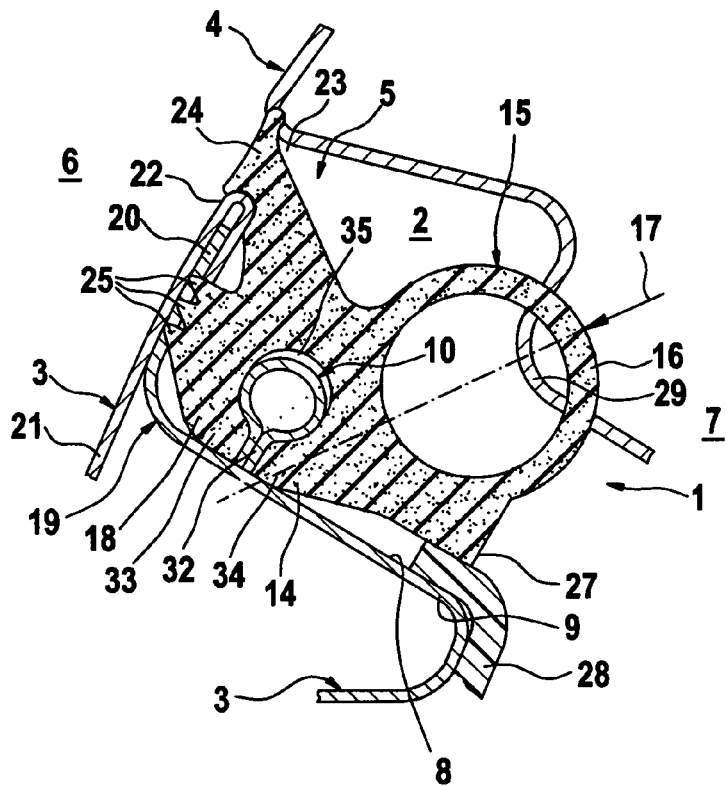

In the case of the exemplified embodiment as shown in FIG. 3, the grip rail 10 comprises a substantially circular ring-shaped cross-sectional area which is attached to the door inner metal sheet 9 by means of a connecting cross-piece 32, in particular it is welded thereto by continuous seam welding. In the region of the connecting cross-piece 32 the grip rail 10 is contacted by anchoring strips 33 and 34 of the holding region 14. In order to ensure that this underclamping of the circular ring-shaped part of the grip rail 10 functions all the more effectively, the side of the grip rail 10 which is remote from the connecting cross-piece 32 is provided in the profile 15 with a free space 35 which is sickle-shaped in cross-section.

Figure 4:
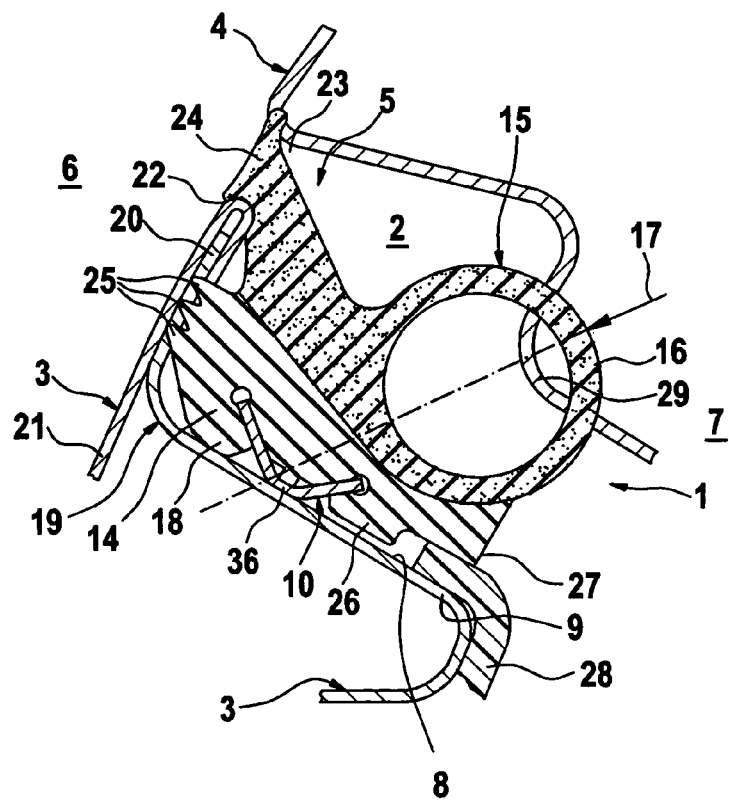

As shown in FIG. 4, the grip rail 10 comprises a substantially V-shaped cross-sectional area, wherein an apex region 36 of the grip rail 10 is attached—preferably by continuous seam welding—to the door inner metal sheet 9.

In FIG. 4, the profile 15 is co-extruded in the duplex process, on the one hand, from cellular rubber for the sealing region 16 and the joint sealing lip 24 and, on the other hand, is co-extruded from soft rubber for the holding region 14. When the profile 15 is not tensioned, as shown in FIG. 4, the supporting rib 26 is also disposed in this case at a small spaced interval from the upper side 8 of the door inner metal sheet 9. The support rib 26 only comes into contact with the upper side 8 if a specific closing force is exerted by the bead 29 upon the sealing region 16 in the direction of the resultant force 17. Preferably, the soft rubber of the holding region has a greater degree of hardness than the cellular rubber of the rest of the profile 15. In this way, the profile 15 is anchored to the first component 3 in a particularly stable manner.

The invention claimed is:

1. A sealing arrangement for a gap between first and second components which are moveable relative to each other between open and closed positions, for example a closing element, such as a door or a hinged lid of a motor vehicle, and an edge of an opening which is to be closed, said first component having a corner and said gap having an inner and an outer side, said sealing arrangement comprising:

a grip rail fixable to the first component;

a profile having a holding region which can be positively latched to said grip rail, said profile further having a sealing region attached to said holding region and which cooperates in a sealing manner with the second component when said first and second components are in the closed position, said sealing region being disposed laterally offset with respect to said grip rail towards the inner side of the gap;

said holding region having a support portion which is remote from said sealing region and which is supportable on the corner region of the first component, said support portion comprising at least one sealing rib which lies against the corner region;

a support rib positioned between said sealing region and said first component, said support rib being movable into contact with said first component when said first component is in the closed position, said support rib otherwise being out of contact with said first component; and wherein a resultant force of a deformation force acting upon said sealing region when the opening is closed runs at least approximately through said grip rail.

2. A sealing arrangement as claimed in claim 1, wherein said first component has an inner side covered with an inner lining, and said profile comprises a sealing strip which lies continuously in a sealing manner against said inner lining, said sealing strip disposed between said sealing region and said inner lining.

3. The sealing arrangement as claimed in claim 1, wherein when the first component is in the closed position, said gap terminates on the outside in a joint between the first and second components, a joint sealing lip, which is integrally formed on said profile, is anchored to an edge of the first component adjoining said joint, and said joint sealing lip lies against the second component to seal said joint.

4. A sealing arrangement as claimed in claim 1, wherein said profile comprises cellular rubber.

5. A sealing arrangement as claimed in claim 1, wherein said holding region comprises soft rubber and said sealing region comprises cellular rubber.

6. A sealing arrangement as claimed in claim 1 wherein said grip rail comprises a substantially U-shaped cross-sectional area and has first and second edge regions drawn in towards each other, and said grip rail has a base attached to the first component.

7. A sealing arrangement as claimed in claim 1, wherein said the grip rail comprises a substantially Z-shaped cross-sectional area, and said grip rail has a base limb attached to the first component.

8. A sealing arrangement as claimed in claim 1, wherein said grip rail comprises a substantially circular ring-shaped cross-sectional area, said grip rail being attached to the first component by means of a connecting cross-piece.

9. A sealing arrangement as claimed in claim 1, wherein said grip rail comprises a substantially V-shaped cross-sectional area and an apex region which is attached to the first component.

10. A sealing arrangement as claimed in claim 1, wherein said grip rail is formed from sheet metal and is attached to said first component by continuous seam welding.

11. A sealing arrangement as claimed in claim 2, wherein said grip rail comprises a substantially circular ring-shaped cross-sectional area, said grip rail being attached to the first component by means of a connecting cross-piece.

12. A sealing arrangement as claimed in claim 2, wherein said grip rail comprises a substantially V-shaped cross-sectional area and an apex region which is attached to the first component.

13. A sealing arrangement as claimed in claim 3, wherein said profile comprises cellular rubber.

14. A sealing arrangement as claimed in claim 3, wherein said holding region comprises soft rubber and said sealing region comprises cellular rubber.

15. A sealing arrangement as claimed in claim 3 wherein said grip rail comprises a substantially U-shaped cross-sectional area and has first and second edge regions drawn in towards each other, and said grip rail has a base attached to the first component.

16. A sealing arrangement as claimed in claim 3 wherein said the grip rail comprises a substantially Z-shaped cross-sectional area, and said grip rail has a base limb attached to the first component.

17. A sealing arrangement as claimed in claim 3, wherein said grip rail comprises a substantially circular ring-shaped cross-sectional area, said grip rail being attached to the first component by means of a connecting cross-piece.

18. A sealing arrangement as claimed in claim 3, wherein said grip rail comprises a substantially V-shaped cross-sectional area and an apex region which is attached to the first component.

19. A sealing arrangement as claimed in claim 4 wherein said grip rail comprises a substantially U-shaped cross-sectional area and has first and second edge regions drawn in towards each other, and said grip rail has a base attached to the first component.

20. A sealing arrangement as claimed in claim 4, wherein said the grip rail comprises a substantially Z-shaped cross-sectional area, and said grip rail has a base limb attached to the first component.

21. A sealing arrangement as claimed in claim 5 wherein said grip rail comprises a substantially U-shaped cross-sectional area and has first and second edge regions drawn in towards each other, and said grip rail has a base attached to the first component.

22. A sealing arrangement as claimed in claim 5, wherein said the grip rail comprises a substantially Z-shaped cross-sectional area, and said grip rail has a base limb attached to the first component.

23. A sealing arrangement as claimed in claim 5, wherein said grip rail comprises a substantially circular ring-shaped cross-sectional area, said grip rail being attached to the first component by means of a connecting cross-piece.

24. A sealing arrangement as claimed in claim 5, wherein said grip rail comprises a substantially V-shaped cross-sectional area and an apex region which is attached to the first component.

25. A sealing arrangement as claimed in claim 7, wherein said grip rail has a second limb having a free end edge that extends towards the outside into a corner region of the first component.

26. A sealing arrangement for a gap between first and second components which are moveable relative to each other between open and closed positions, for example a closing element, such as a door or a hinged lid of a motor vehicle, and an edge of an opening which is to be closed, said first component having a corner and an inner side covered with an inner lining and said gap having an inner and an outer side, said sealing arrangement comprising:
a grip rail fixable to the first component;
a profile having a holding region which can be positively latched to said grip rail, said profile further having a sealing region attached to said holding region and which cooperates in a sealing manner with the second component when said first and second components are in the closed position, said sealing region being disposed laterally offset with respect to said grip rail towards the inner side of the gap, said profile further including a support rib positioned between said sealing region and the first component, said support rib being in contact with the first component when the first component is in the closed position, said support rib otherwise being out of contact with said first component;
said holding region having a support portion which is remote from said sealing region and which is supportable on the corner region of the first component, said support portion comprising at least one sealing rib which lies against the corner region;
a sealing strip disposed between said sealing region and said inner lining, said sealing strip lying continuously in a sealing manner against said inner lining; and
wherein a resultant force of a deformation force acting upon said sealing region when the opening is closed runs at least approximately through said grip rail.

27. A sealing arrangement as claimed in claim 26, wherein said grip rail is formed from sheet metal and is attached to said first component by continuous seam welding.

28. The sealing arrangement as claimed in claim 26, wherein when the first component is in the closed position, said gap terminates on the outside in a joint between the first and second components, a joint sealing lip, which is integrally formed on said profile, is anchored to an edge of the first component adjoining said joint, and said joint sealing lip lies against the second component to seal said joint.

29. A sealing arrangement as claimed in claim 26, wherein said profile comprises cellular rubber.

30. A sealing arrangement as in claim 26, wherein said holding region comprises soft rubber and said sealing region comprises cellular rubber.

31. A sealing arrangement for a gap between first and second components which are moveable relative to each other between open and closed positions, for example a closing element, such as a door or a hinged lid of a motor vehicle, and an edge of an opening which is to be closed, said first component having a corner and an inner side covered with an inner lining and said gap having an inner and an outer side, said sealing arrangement comprising:
a grip rail fixable to the first component, said grip rail comprising a substantially U-shaped cross-section area having first and second edge regions drawn in towards each other, said grip rail having a base attached to the first component;
a profile having a holding region which can be positively latched to said grip rail, said profile further having a sealing region attached to said holding region and which cooperates in a sealing manner with the second component when said first and second components are in the closed position, said sealing region being disposed laterally offset with respect to said grip rail towards the inner side of the gap;
said holding region having a support portion which is remote from said sealing region and which is supportable on the corner region of the first component, said support portion comprising at least one sealing rib which lies against the corner region;
a sealing strip disposed between said sealing region and said inner lining, said sealing strip lying continuously in a sealing manner against said inner lining; and
wherein a resultant force of a deformation force acting upon said sealing region when the opening is closed runs at least approximately through said grip rail.

* * * * *

UNITED STATES PATENT AND TRADEMARK OFFICE
CERTIFICATE OF CORRECTION

PATENT NO. : 7,059,611 B2  Page 1 of 1
APPLICATION NO. : 10/475274
DATED : June 13, 2006
INVENTOR(S) : Ahlers et al.

It is certified that error appears in the above-identified patent and that said Letters Patent is hereby corrected as shown below:

Claim 1, Column 5, lines 61-63, delete "for example a closing element, such as a door or a hinged lid of a motor vehicle,"

Claim 26, Column 7, lines 55-57, delete "for example a closing element, such as a door or a hinged lid of a motor vehicle,"

Claim 31, Column 8, lines 37-39, delete "for example a closing element, such as a door or a hinged lid of a motor vehicle,"

Signed and Sealed this

Twelfth Day of December, 2006

JON W. DUDAS
*Director of the United States Patent and Trademark Office*